Patented Apr. 21, 1925.

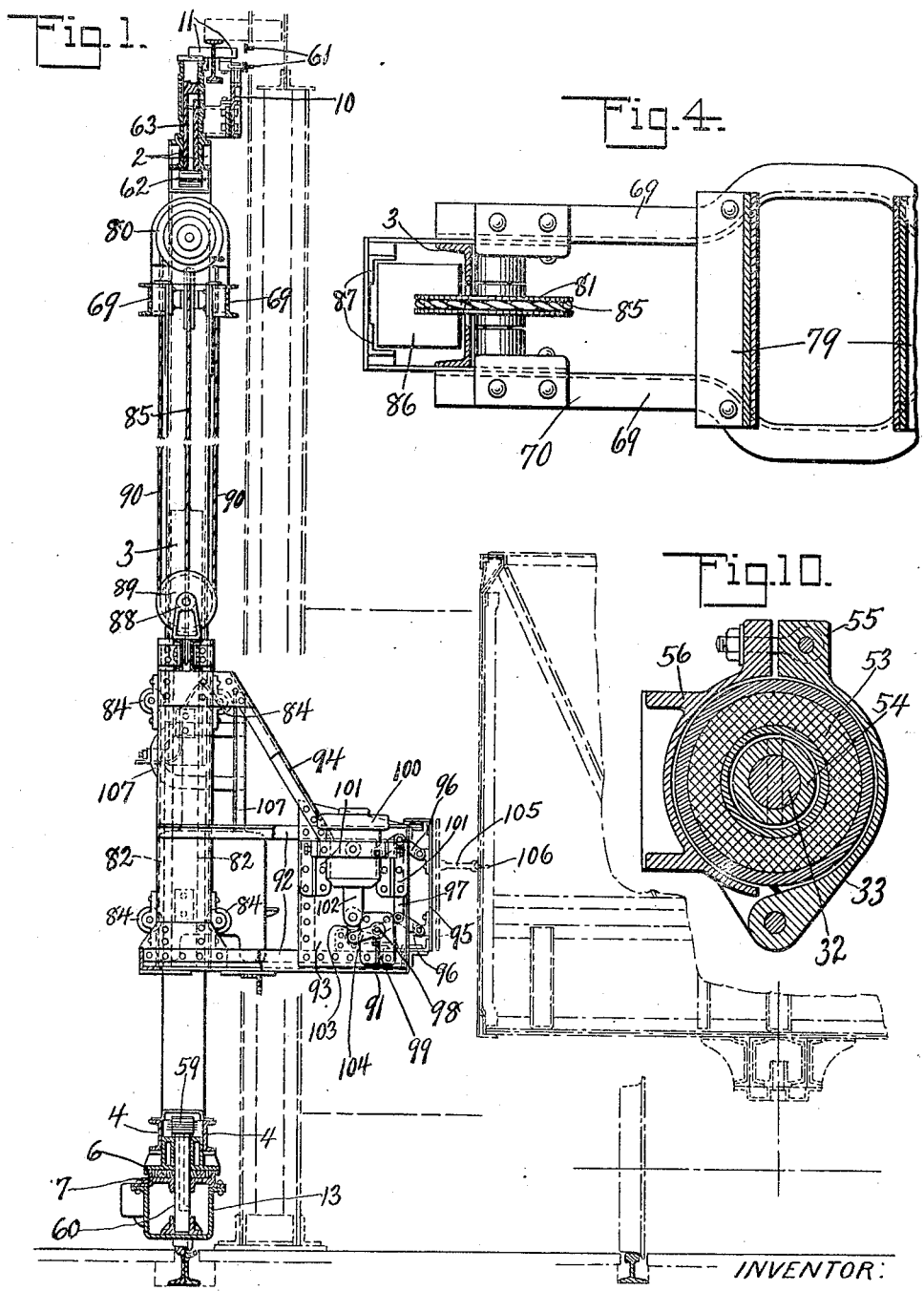

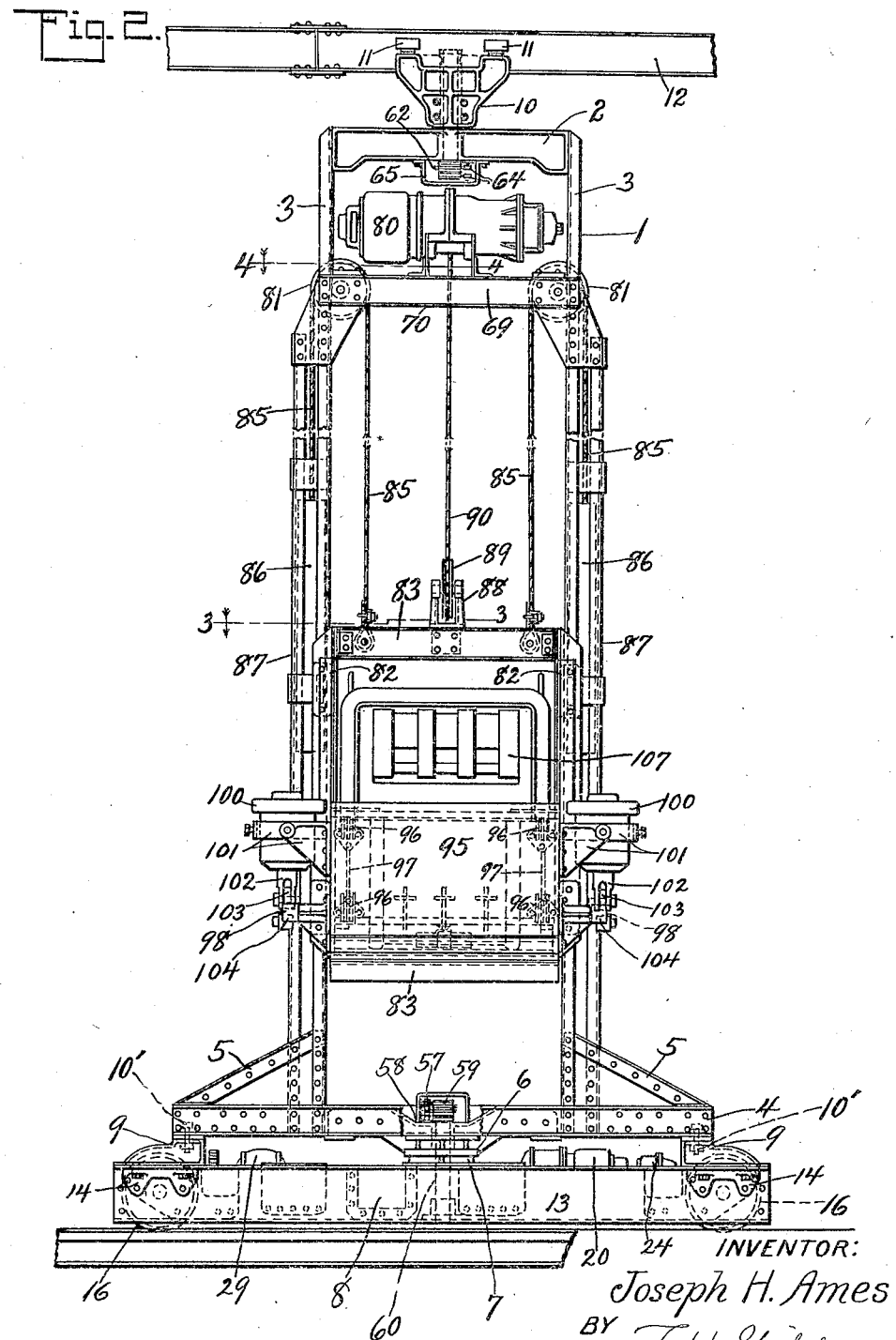

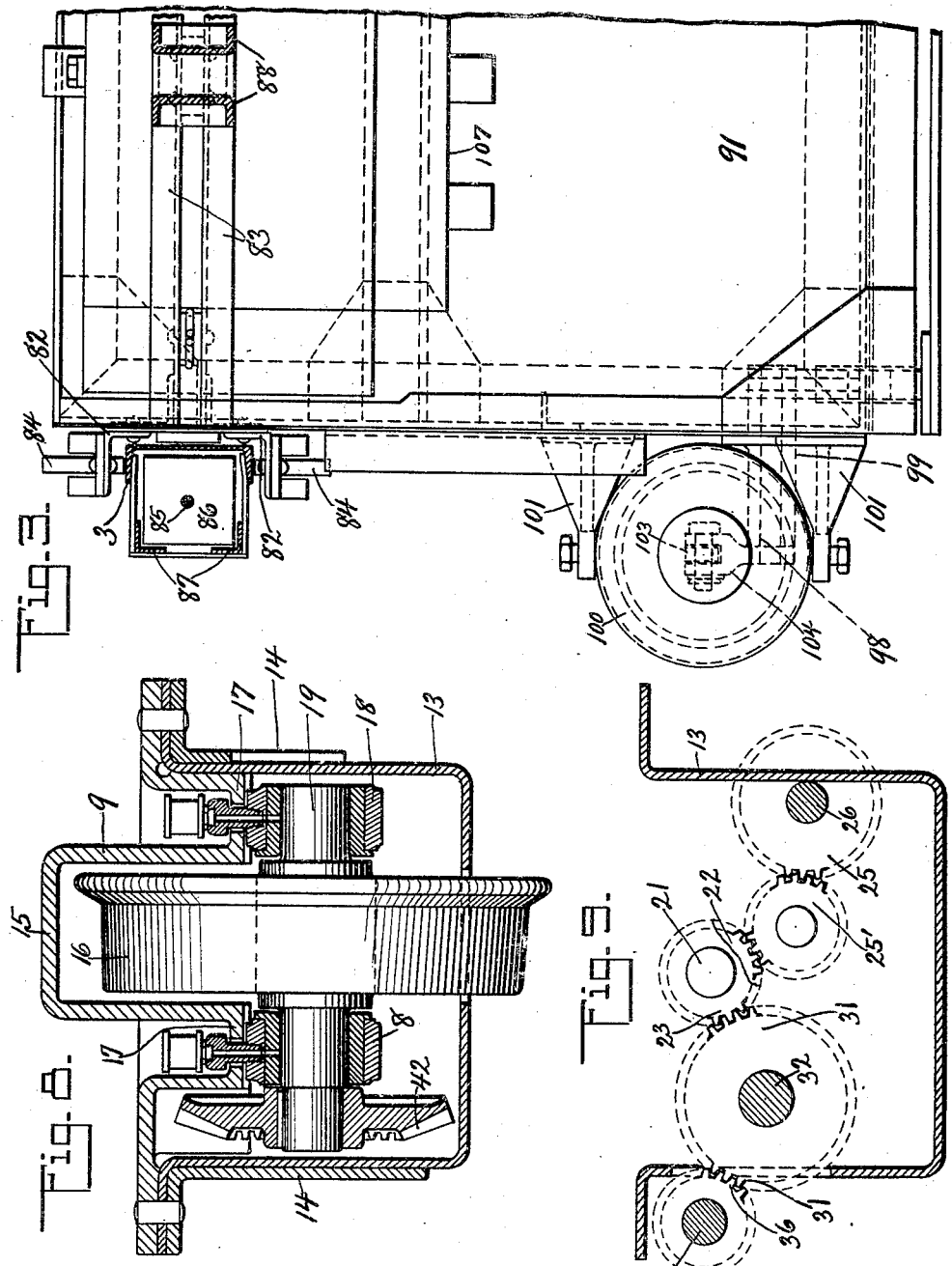

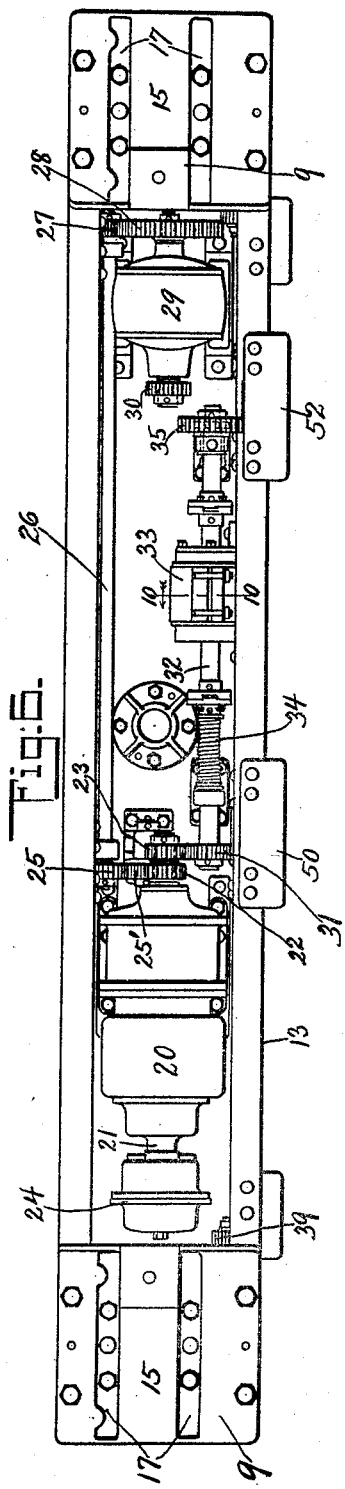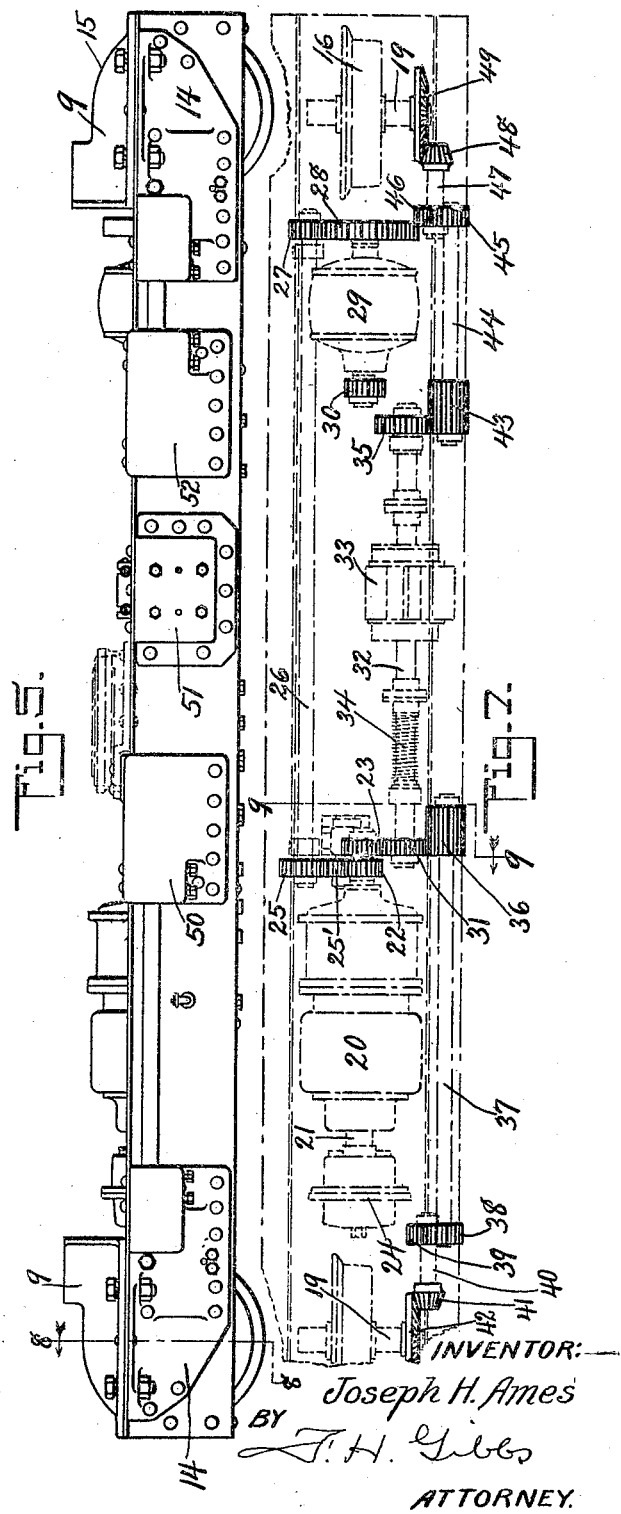

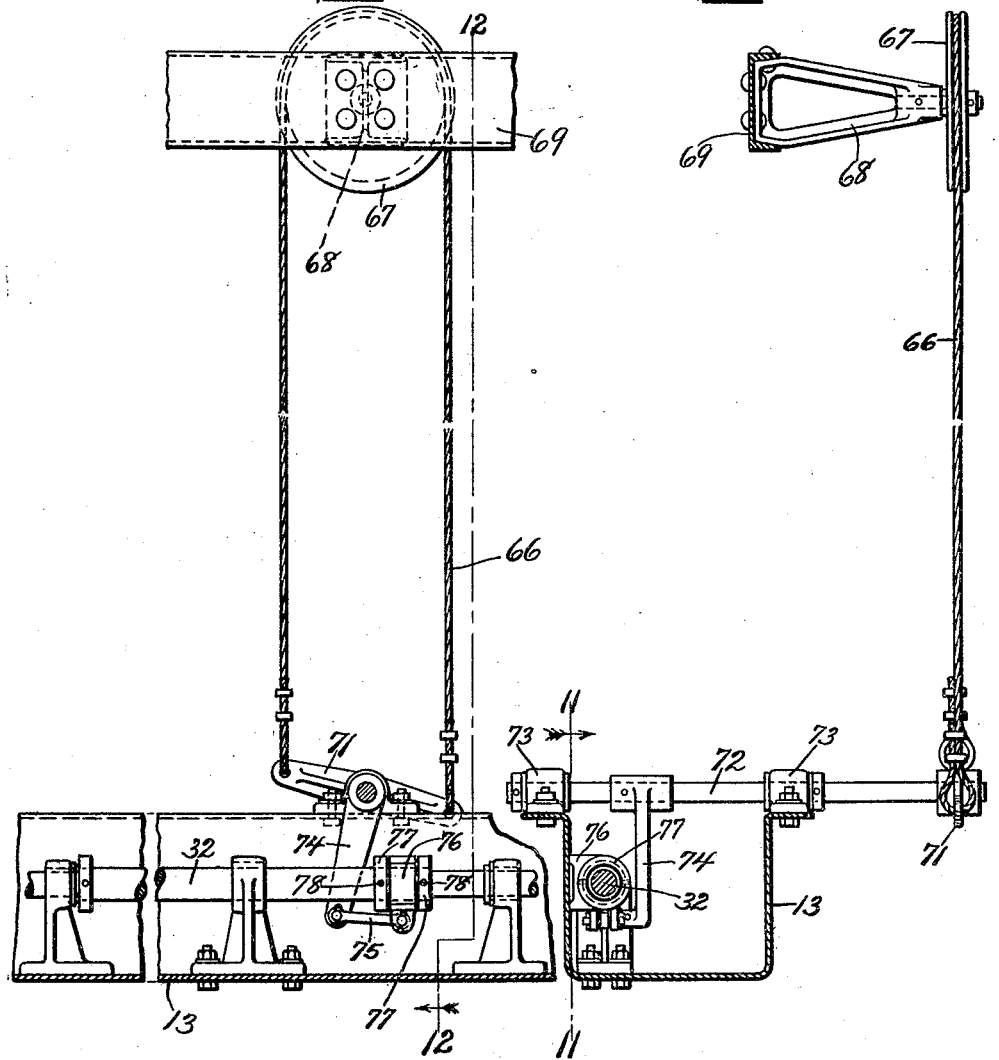

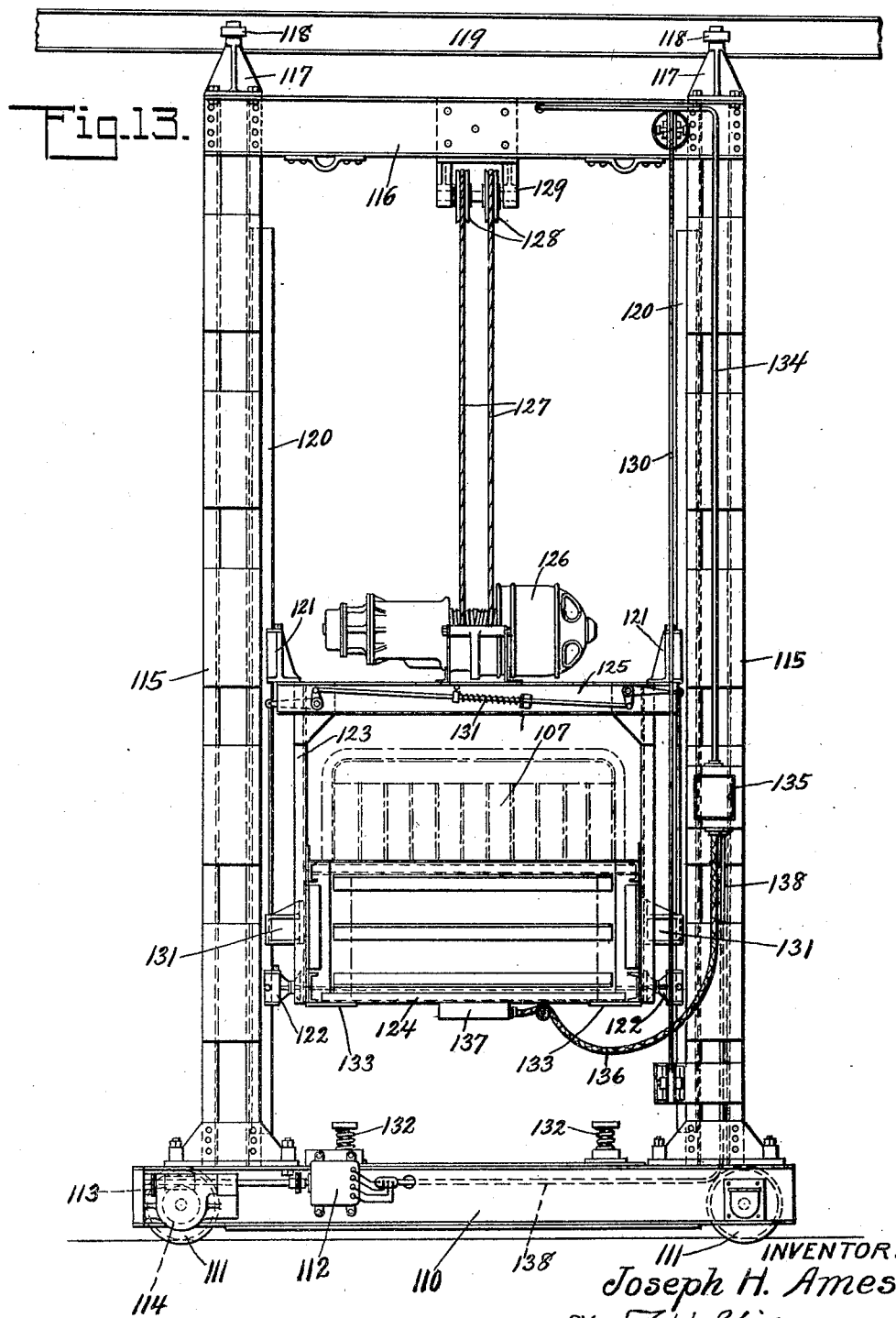

1,534,018

UNITED STATES PATENT OFFICE.

JOSEPH H. AMES, OF NEW YORK, N. Y., ASSIGNOR TO AMERICAN CAR AND FOUNDRY COMPANY, OF NEW YORK, N. Y., A CORPORATION OF NEW JERSEY.

TRAVELING RIVETING PLATFORM.

Application filed March 31, 1922. Serial No. 548,375.

*To all whom it may concern:*

Be it known that I, JOSEPH H. AMES, residing at New York, New York County, State of New York, and being a citizen of the United States, have invented certain new and useful Improvements in a Traveling Riveting Platform, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a view partly in side elevation and partly in section of my improved riveting platform, a car being indicated in dotted lines to show the relation of the platform to the work;

Fig. 2 is a front elevation, partly broken away, of my device;

Fig. 3 is a view, drawn to a larger scale, of a section taken on the line 3—3 of Fig. 2;

Fig. 4 is a section taken on the line 4—4 of Fig. 2;

Fig. 5 is a side elevation of the truck on which the platform is carried;

Fig. 6 is a top plan view of the truck shown in Fig. 5;

Fig. 7 is a view showing the arrangement of the driving apparatus on the truck shown in Fig. 5, the gears being shown in solid lines and the remainder of the apparatus being shown in dotted lines;

Fig. 8 is a section taken on the line 8—8 of Fig. 5;

Fig. 9 is a section taken on the line 9—9 of Fig. 7;

Fig. 10 is a section taken on the line 10—10 of Fig. 6, showing the magnetic gear shifting device;

Fig. 11 is a view, partly an elevation and partly a section taken on the line 11—11 of Fig. 12, of a manually operated gear shifting means;

Fig. 12 is a section taken on the line 12—12 of Fig. 11; and

Fig. 13 is a view in elevation of a modified form of my device.

It is an object of my invention to provide an improved traveling riveting platform of the type that is adapted to travel with the work as the work is carried along on a slowly moving carrier. It is also an object of my invention to provide a platform of the kind described that travels independently of the work, that may be adjusted to different positions and which is provided with mechanically operated means for operating a holding-up device used in riveting.

With these and other objects in view my invention comprises a frame 1 having a top member 2, side members 3 and a bottom member 4 which projects beyond the side members 3 and has reenforcing angles 5 connecting its ends with the side members 3. At its center, the member 4 is provided with a bearing 6 by which it is rotatably supported upon a corresponding bearing 7 carried by a supporting truck 8 and at its ends the member 4 rests upon bearing members 9 mounted on the truck 8. Bolts 10' passing through the member 4 and members 9 keep the frame 1 from rotating on the truck 8 but these bolts may be readily removed when it is desired to rotate the frame 1. At the top the frame 1 is supported by a guide member 10 pivotally mounted in the top member 2 and having rollers 11 engaging a guiding and supporting beam 12 that is supported in any desired manner as by the metal frame of the enclosing building.

The truck 8 comprises a pressed trough-shaped member 13 having cast reenforcing members 14 secured to its ends, the flanges of the members 13 being secured between the flanges of the members 14 and flanges of the bearing members 9. The members 9 have curved portions 15, which form shields for the wheels 16 of the truck 8, and depressed portions 17 which engage with the boxes 18 in which the axles 19 of the wheels 16 are journaled. To operate the truck 8 there is provided a motor 20 having a shaft 21 on which are mounted gears 22 and 23 and an automatic brake 24. The gear 22, through an idle gear 25', drives a gear 25 mounted on one end of a shaft 26 having a gear 27 mounted on its other end. The gear 27 engages a gear 28 on the shaft of a speed reducing transformer 29 and serves to drive a gear 30. The gear 23 engages a gear 31 on one end of a shaft 32 adapted to be shifted longitudinally by a magnetic device 33 against the action of a spring 34 and having a gear 35 on its other end. The gear 31 engages a gear 36 on a shaft 37 carrying a gear 38 which engages a gear 39 on a shaft 40 carrying a bevel gear 41 which engages a bevel gear 42 on an axle 19. Gear 35 engages a gear 43 on a shaft 44 carrying a gear 45 which engages a gear 46 on a shaft 47 carrying a bevel gear 48 which engages a bevel gear 49 on an axle 19. The various parts of the apparatus are supported from the member 13, reenforcing members or plates 50, 51, 52, being provided where necessary to hold the parts properly positioned.

When the magnetic device 33 is deenergized the spring 34 keeps the gear 31 in engagement with the gear 23 so that the motor drives the truck 8 in one direction through gears 23, 31 and 36 and shaft 32 and gears 35 and 43. When the magnetic device 33 is energized the shaft 32 is shifted against the action of the spring 34 so that the gear 31 is disengaged from the gear 23 and the gear 35 is engaged with the gear 30, the gears 31 and 35 remaining engaged with the gears 36 and 43 respectively. The motor 20 then drives the truck at a reduced speed in the opposite direction through gears 22, 25' and 25, shaft 26, gears 27 and 28, speed reducing transformer 29, gears 30, 35 and 43 and shaft 32 and gears 31 and 36. As shown in Fig. 10, the magnetic device 33 comprises a solenoid 53 having a portion 54 of the shaft 32 for its armature and clamped by pivoted arm 55 in a supporting member 56 carried by the member 13. The solenoid 53 and motor 20 are energized from any suitable source of power through control switches, not shown, mounted on the platform. Electrical connections between the platform and truck 8 are established by means of contact brushes 57, supported by a frame 58 on the member 4, engaging with collector rings 59 mounted on the center pin 60 that passes through the bearings 6 and 7 and is supported on the truck 8. Conductors connect the brushes 57 to the controllers on the platform and the collector rings 59 to the motor 20 and solenoid 53. Current for operating the motor 20 and solenoid 53 may be gathered from power rails 61, supported by the building frame, by brushes mounted on the guide member 10 and connected to the collector rings 62 on the guide member pivot 63. Brushes 64 supported by bracket 65 from member 2 engage the collector rings 62 and are connected to the various controllers on the platform.

Where the rotation of the frame 1 on the truck 8 is not required the shaft 32 may be operated manually by means of a cable 66 which passes over a pulley 67 carried by a bracket 68 supported on one of the channel bars 69 of a cross member 70 of the frame 1. The ends of the cable 66 are attached to the ends of a lever 71 which is mounted, at its center, on a shaft 72 journaled in bearings 73 carried by the trough-shaped member 13. Keyed to the shaft 72 is a crank arm 74 connected by a link 75 to a collar 76 rotatably mounted on the shaft 32 but held against longitudinal movement thereon by collars 77 which are secured to the shaft 32 by set screws 78. With this construction the spring 34 is omitted and, if desired, a spring pressed lock may be used to yieldingly hold the shaft 32 in the position to which it is shifted by the operation of the cable 66.

The cross member 70 of the frame 1 comprises a plurality of spaced channel bars 69 extending between the side members and connected by spaced angle bars 79. Mounted on the cross member 70 is a motor 80 while sheaves 81 are journaled in bearings attached to the ends of the channel bars 69. Mounted in the frame 1 so as to be reciprocated therein, is a frame comprising vertical side members 82 and cross members 83. The side members 83 are provided with rollers 84 which engage the side members 3 of the frame 1. To the upper cross member 83 are secured the ends of a plurality of cables 85 which pass over sheaves 81 and have their other ends connected to counter-weights 86 which are guided in their movements by the side members 3 and angle bars 87 secured to the side members 3. Also secured to the upper cross member 83 is a bracket 88 in which is journaled a sheave 89 over which passes a cable 90 having one end secured to the casing of the motor 80 and the other end secured to a winding drum operated by the motor 80. Secured to the side members 82 and lower member 83 is an outwardly projecting platform 91 provided with upper and lower rails 92 which are connected, at the sides of the platform, by plates 93. Reenforcing members 94 connect the plates 93 and upper rails 92 to the vertical members 82. Slidably mounted upon guides carried by the rails 92 is a holding-up plate 95 adapted to be forced forward by a plurality of sets of toggle-levers 96, the sets at each end of the plate having their middle points connected by a link 97 so that the toggle-levers will be operated simultaneously and the plate kept in a vertical position. The lower sets of the toggle-levers 96 have their fixed ends mounted on shafts 98 which are mounted in bearings 99 carried by the plates 93. To operate the shafts 98 there are provided a plurality of solenoids 100 pivotally mounted on brackets 101, carried by the plates 93, and having armatures 102 connected by links 103 to crank arms 104 fixed on the shaft 98. With the platform in position before the work, energizing the solenoids 100 will operate the toggle-levers 96 to force the plate 95 into engagement with a holding-up tool 105 so that a rivet 106 will be held in position while being headed. Deenergizing the solenoids 100 will release the armatures 102 which will fall, due to their weight, and operate the toggle-levers 96 to retract the plate 95. Controls for the motor 80 and solenoids 100 are mounted on the platform within reach of the operator. There is also mounted on the platform an electric rivet heater 107 so that heated rivets may be taken from the heater and inserted in the openings in the work. It will be noted that the plate 95 substantially covers the front of the platform, extending the full width of the platform and from the lower rail 92 to the upper rail 92, and is held in vertical position by the toggle levers and guides providing a surface of considerable area with which the holding-up tool 105 may be engaged for the heading of the rivets, thus permitting of the heading of a number of rivets without necessitating a movement of the platform or plate and obviating the necessity of accurately positioning the holding-up device or platform with respect to the rivet to be headed.

In Fig. 13 is shown a simplified form of my device that can be used where it is not desired to rotate the supporting frame or to provide for such extreme variations in the rate of travel of the device that different gear ratios are necessary. As shown, the device comprises a base or bottom member 110 supported on wheels 111, one of which is adapted to be driven by a motor 112 through a worm 113 and a worm wheel 114. Rigidly secured to the base 110 are the vertical side members 115, joined at their tops by a cross piece 116 and carrying brackets 117 in which are guide rollers 118 that engage a guide rail 119. Secured to the side members 115 are T-guide rails 120 that are engaged by fixed guide members 121 and swiveled guide members 122 secured to the frame 123 which carries the moving platform 124. Mounted on the cross member 125 of the frame 123 is a motor 126, which serves to raise and lower the platform by means of cables 127 passing over sheaves 128 carried by a bracket 129 attached to the cross pieces 116. To protect the operators on the platform, a centrifugal brake device 130 and an emergency brake device 131, both of common construction, are provided, and on the base 110 are mounted spring bumpers 132 adapted to engage bumper plates 133 carried by the platform.

Current for operating the motors is supplied by conductors which lead from collectors, not shown, through conduit 134 to a breaker and distribution box 135 which is connected by flexible conductors 136 to a terminal box 137 and the various controllers, not shown, on the platform. Conductors in a conduit 138 connect the motor 112 to the distribution box 135.

Mounted on the platform 124 is an electric rivet heater 107 and carried by the platform 124 is a holding-up plate as shown in Figs. 1 and 2.

While I have shown my device as used in the manufacture of railway cars, it is to be understood that my device may be used in any case where it is desirable to have a riveting platform that can be readily changed to any position or made to travel with the work or by itself. It will also be apparent that by using controllers whereby the operation of the motor can be reversed that the platform can be raised and lowered or can be made to travel in either direction along the floor at a suitable rate of speed.

What I claim is:

1. In a device of the class described, an independently operated work platform, a movable plate carried by said platform for holding-up rivets while being headed and operating means for moving said plate to and from holding-up position.

2. In a device of the class described, a platform adapted to be moved independently of the work, a vertically positioned plate for holding-up rivets while being headed carried by said platform and operating means adapted to move said plate outwardly from said platform.

3. In a device of the class described, a platform adapted to travel with the work and a rivet holding-up plate mounted in front of and carried by said platform adapted to be moved outwardly from said platform.

4. In a device of the class described, a platform, a vertical plate extending across the front of said platform and adapted to support a holding-up tool and means to move said plate outwardly into engagement with the holding-up tool.

5. In a device of the class described, a platform, adapted to be moved vertically and horizontally and a plate for holding-up rivets mounted in front of and carried by said platform adapted to be moved outwardly from said platform.

6. In a device of the class described, a platform, a plate supported from said platform in a vertical plane and means to move said plate away from said platform while maintaining said plate in a vertical plane.

7. In a device of the class described, an operator's platform, a rotatable support for said platform and a holding-up device carried by said platform.

8. In a device of the class described, a platform, a holding-up plate extending across the front of said platform and electrically operated means adapted to force said plate outwardly from said platform.

9. In a device of the class described, a rotatably mounted operator's platform adapted to be moved vertically and horizontally and a holding-up device carried by said platform.

10. In a device of the class described, a truck, a support rotatably mounted on said truck and an operator's platform adjustably mounted on said support.

11. In a device of the class described, a truck, a support rotatably mounted on said truck, an operator's platform carried by said support and a holding-up device carried by said platform.

12. In a device of the class described, a truck, a support rotatably mounted on said truck, an operator's platform carried by said support, means carried by said support for moving said platform, a holding-up device and means carried by said platform for operating said holding-up device.

13. In a device of the class described, a truck, a support rotatably mounted on said truck, an operator's platform carried by said support, operating means for said platform carried by said support, a holding-up device carried by said platform and operating means for said holding-up device.

14. In a device of the class described, a platform, a holding-up plate movably mounted on said platform, toggle-levers for moving said plate and means for operating said toggle-levers.

15. In a device of the class described, a movable support, a platform movably mounted on said support, a holding-up plate movably mounted on said platform, toggle-levers for moving said plate and means for operating said toggle-levers.

16. In a device of the class described, a truck, a support carried by said truck, a platform carried by said support, operating means for said platform carried by said support, a holding-up plate extending across the front of said platform and operating means adapted to move said plate outwardly from said platform.

17. In a device of the class described, a movable operator's platform, a vertically positioned holding-up plate movably mounted in front of said platform and operating means to force said plate outwardly.

18. In a device of the class described, an operator's platform, a holding-up plate movably mounted on said platform, toggle levers to operate said plate and electrically operated means for operating said toggle levers.

19. In a device of the class described, a movable support, a platform movably mounted on said support, a holding-up plate movably mounted on said platform, toggle levers for operating said plate and solenoids pivotally mounted on said platform for operating said toggle levers.

20. In a device of the class described, a rotatably mounted supporting means, an operator's platform adapted to be moved vertically in said supporting means and a holding-up device carried by said platform.

21. In a device of the class described, a rotatably mounted supporting means adapted to be moved horizontally, an operator's platform mounted for vertical movement in said supporting means, a holding-up device slidably mounted on said platform and operating means for said holding-up device carried by said platform.

In witness whereof I have hereunto set my hand in the presence of two witnesses.

JOSEPH H. AMES.

Witnesses:
ELLEN G. WEBSTER,
R. W. SMITH.